United States Patent [19]
Jarvis

[11] 3,797,686
[45] Mar. 19, 1974

[54] APPARATUS FOR CONVEYING PIPE LONGITUDINALLY

[75] Inventor: Harold F. Jarvis, Moffat, Canada

[73] Assignee: Shaw Pipe Industries, Ltd., Rexdale, Ontario, Canada

[22] Filed: July 5, 1973

[21] Appl. No.: 376,733

[52] U.S. Cl. .................................. 214/338
[51] Int. Cl. .................................. B65h 51/00
[58] Field of Search ............ 214/338, 339, 340, 1 P; 226/168

[56] References Cited
UNITED STATES PATENTS
3,581,922  6/1971  Versoy ............................... 214/338
3,664,531  5/1972  Hangnusson ...................... 214/339

*Primary Examiner*—Richard A. Schacher
*Assistant Examiner*—Gene A. Church

[57] ABSTRACT

Apparatus for conveying pipe longitudinally comprises a main conveyor section and first and second terminal conveyor sections positioned respectively to advance incoming pipe sections to the main conveyor section and to receive treated pipe sections from the main conveyor section, each conveyor section being adapted to locate the pipe sections continuously about a longitudinal axis while longitudinally advancing the sections at a selected feed. Each of the terminal conveyor sections is movable longitudinally by power means to effect coupling of the incoming pipe sections and detachment of the leading pipe sections, respectively, and is selectively operable to advance a pipe section carried thereby at the selected speed to permit such coupling or detachment, and to advance a pipe section at a speed greater than the selected speed prior to such coupling, or after such detachment.

7 Claims, 6 Drawing Figures

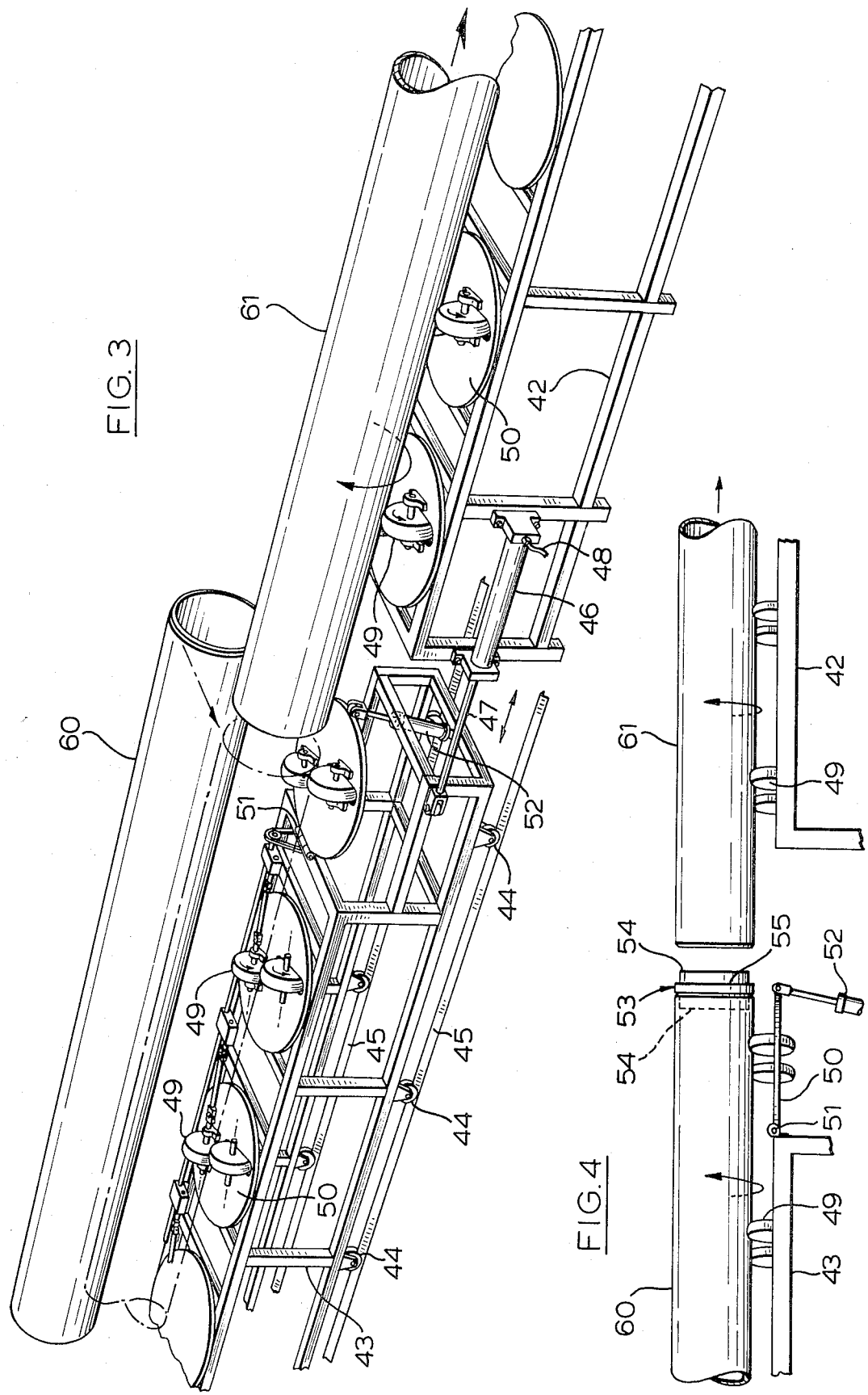

APPARATUS FOR CONVEYING PIPE LONGITUDINALLY

FIELD OF THE INVENTION

This invention relates to an apparatus for conveying pipe longitudinally through a treatment zone, for example in the treatment of pipe by applying a curable coating material to its external surface.

BACKGROUND OF THE INVENTION

In my copending patent application Ser. No. 209,574, now Pat. No. 3,743,124, entitled "Apparatus for Conveying Pipe Longitudinally", filed on Dec. 20, 1971, there is described an apparatus for continuously conveying pipe composed of a number of pipe sections coupled together in end to end relation by coupling members which provide detachable spigot connections between the ends of adjacent pipe sections, the pipe being continuously rotated about a longitudinal axis while being advanced longitudinally. In the method of use of the apparatus, incoming pipe sections are successively coupled to the trailing end of the coupled pipe sections, and threaded pipe sections are successively detached from the leading end. In order to maintain the continuous advance of the coupled pipe sections through the treatment zone, it is necessary to couple the incoming pipe sections and to detach the treated pipe sections without interrupting the advance of the coupled pipe sections.

It is an object of the present invention to provide an apparatus for effecting such coupling and detachment in such a way as to avoid damage to the pipe sections, or to the conveyor drive mechanisms, through possible binding between the coupling members and the pipe sections to which they are fitted.

SUMMARY OF THE INVENTION

An apparatus according to the invention essentially comprises a main conveyor section extending through the treatment zone, a first and second terminal conveyor sections positioned respectively to advance incoming pipe sections to the main conveyor section and to receive treated pipe sections from the main conveyor section, each conveyor section being adapted to rotate the pipe sections continuously about a longitudinal axis while longitudinally advancing the sections at a selected speed. Each of the terminal conveyor sections is movable longitudinally by power means to effect coupling of the incoming pipe sections and detachment of the treated pipe sections, respectively, and is selectively operable to advance a pipe section carried thereby at said selected speed to permit such coupling or detachment, and to advance a pipe section at a speed greater than the selected speed prior to such coupling, or after such detachment.

BRIEF DESCRIPTION OF THE DRAWINGS

One preferred embodiment of the invention is illustrated by way of example in the accompanying drawings, in which:

FIG. 3 is a fragmentary perspective view of a detail of the apparatus showing the relative positions of two conveyor sections; and FIGS. 4, 5 and 6 are fragmentary side views of the apparatus showing three successive stage in the advance of the pipe.

DESCRIPTION OF THE PREFERRED EMBODIMENT

Figure 1:
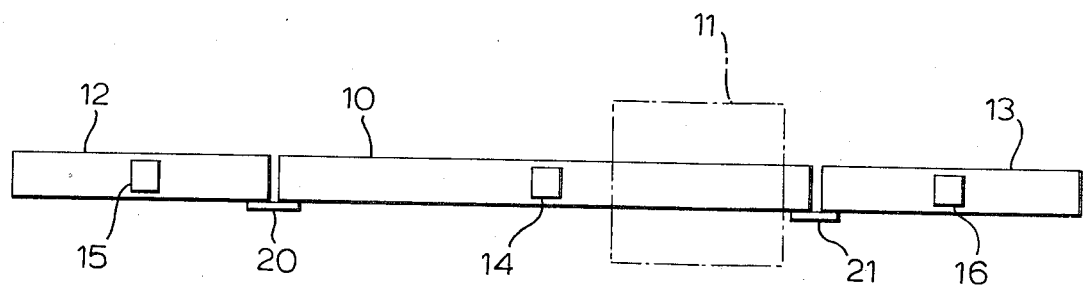
FIG. 1 is a diagrammatic plan view of the apparatus.
Figure 2:
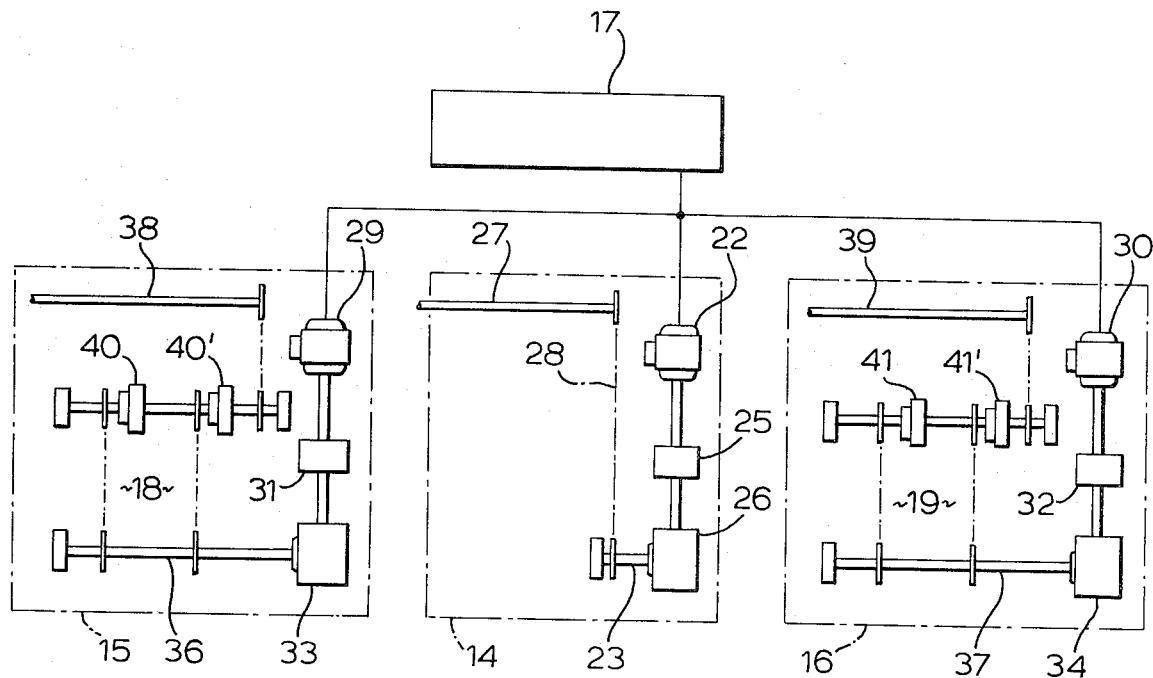
FIG. 2 is a schematic diagram of the controls for the drives of the respective conveyor sections of the apparatus.
Figure 5:
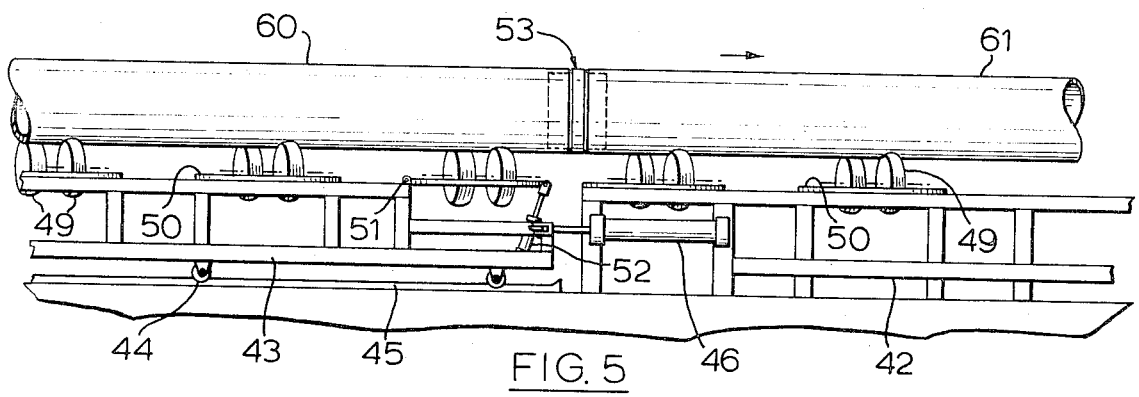
Figure 6:
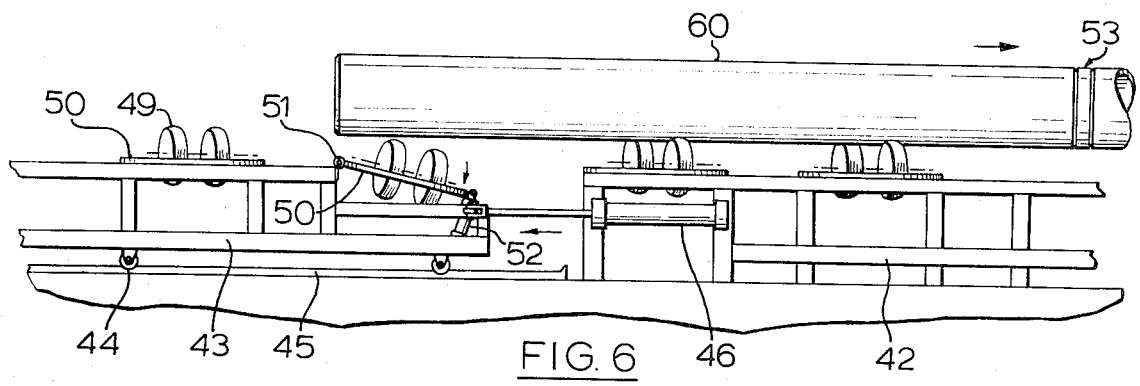

The first linear displacement motor 20 (the second linear displacement motor 21 being constructed and arranged in the same way) comprises a hydraulic cylinder 46 mounted horizontally on the support frame 42 and housing a slidable piston the piston rod of which 47 is connected to the movable support frame 43. Pressurized fluid is supplied to and from the cylinder via a fluid connection 48. The conveying means of each conveyor section comprises a plurality of longitudinally spaced pairs of wheels 49 whose axes are parallel and inclined to the longitudinal direction of pipe feed, the wheels of each pair being longitudinally offset whereby to from a cradle for supporting the pipe, and said pairs of wheels being mounted on respective platforms 50. In each of the conveyor sections 10 and 12 the leading platform 50 is hinged to the support frame, as indicated at 51 in FIG. 3, and a power cylinder 52 is connected between the leading platform and the respective support frame for raising and lowering the pair of wheels carried by the platform to and from a position in which the wheels engage a pipe section to be advanced. In FIGS. 5 and 6, FIG. 5 shows the leading pair of wheels in the raised position for supporting the pipe, and FIG. 6 shows the pair of wheels in the lowered position.

As best seen in FIG. 4, each of the coupling members 53 comprises a body portion 55 and a pair of opposed, axially extending spigot portions 54 which are adapted to engage frictionally the internal surfaces of a pair of adjacent pipe sections to be coupled.

In use of the apparatus, each successive incoming pipe section 60, having been fitted with a coupling member 53 at its leading end, is fed laterally onto the conveying means of the first terminal conveyor section 12. At this stage the conveying means are being operated at the same speed; the hydraulic ram 20 is fully extended so that the support frame 43 is at a maximum distance from the support frame 42 of the main conveyor section. The operator then disengages the clutch 40 and engages the clutch 40' so that the pipe section 60 will be advanced at twice the speed of the pipe section 61 carried by the main conveyor section. When the leading end of the pipe section 60 is brought into close juxtaposition with the trailing end of the pipe section 61, the operator disengages the clutch 40' and simultaneously engages the clutch 40 so that the two pipe sections will be advanced at the same speed once again. In practice, pipe sections may be slightly bowed and so the ends of the pipe sections may not be truly aligned. In order to minimize misalignment between the ends to be coupled, the operator should actuate the clutches at a time when the misalignment is a minimum. Thereafter, the operator energizes the hydraulic ram 20 to advance the conveyor section 12 towards the main conveyor section, whereby to effect the spigot connection between the pipe section 60 and the pipe section 61. FIG. 4 shows the pipe sections immediately before the conveyor section 12 is advanced, and FIG. 5 shows the pipe sections after the hydraulic ram 20 has been actuated to advance the first terminal conveyor section 12, the pipe sections 60 and 61 now being coupled together by the coupling member 53. When the trailing pipe section 60 has been advanced to a position at which it no longer engages the driven wheels of the conveyor section 12, the leading pair of wheels 49 are lowered out of supporting relation to the pipe section 60 by actuation of the power cylinder 52, as shown in FIG. 6; the hydraulic ram 20 is then extended to move the first terminal conveyor section 12 to its initial position.

The method of decoupling pipe sections at the second terminal conveyor section is essentially similar, but the steps are performed in the reverse order. The hydraulic ram 21 is initially contracted, and the clutch 41 is initially engaged so that the second terminal conveyor section is operated at the same speed as the main conveyor section. When the leading pipe section of the pipe assembly advanced from the main conveyor section 10 has cleared the driven wheels of the latter conveyor section, the leading pair of wheels of the latter are lowered from engagement with the pipe section, and the hydraulic ram 21 is extended so as to advance the second terminal conveyor section 13 and thereby decouple the leading pipe section from the assembly. When the leading pipe section has been decoupled, the operator disengages clutch 41 and engages clutch 41' so as to operate the second terminal conveyor section at twice the speed of the main conveyor section and thereby advance the decoupled pipe section away from the pipe assembly.

What I claim as my invention is:

1. Apparatus for conveying pipe longitudinally through a treatment zone, the pipe consisting of a plurality of pipe sections coupled together in end to end relation by means providing detachable spigot connections between adjacent pipe sections, the apparatus comprising:
   a main conveyor section extending longitudinally through the treatment zone for advancing the coupled pipe sections therethrough,
   a first terminal conveyor section adapted to receive individual pipe sections to be conveyed, the first terminal conveyor section being longitudinally aligned with the main conveyor section and positioned to advance said individual pipe sections thereto,
   a second terminal conveyor section longitudinally aligned with the main conveyor section and positioned to receive pipe sections successively advanced therefrom,
   each of said conveyor sections including conveying means adapted to rotate the pipe sections carried thereby about a longitudinal axis while longitudinally advancing same,
   control means for operating said conveying means at a common selected speed,
   first variable speed means coupled to the conveying means of the first terminal conveyor section for selectively operating same at a speed higher than said selected speed, whereby to advance said individual pipe sections successively towards the coupled pipe sections carried by the main conveyor section,
   first power means connected to the first terminal conveyor section for advancing same towards the main conveyor section, whereby to effect the spigot connections between said individual pipe sections and the coupled pipe sections,
   second power means connected to the second terminal conveyor section for advancing same away from the main conveyor section, whereby to detach successive pipe sections from the coupled pipe sections advanced from the main conveyor section,
   and second variable speed means coupled to the conveying means of the second terminal conveyor section for selectively operating same at a speed higher than said selected speed, whereby to advance said detached pipe sections successively away from the coupled pipe sections.

2. Apparatus according to claim 1, wherein said means providing detachable spigot connections are constituted by coupling members each comprising a body portion and a pair of opposed, axially extending spigot portions adapted to engage frictionally the internal surfaces of a pair of adjacent pipe sections.

3. Apparatus according to claim 1, wherein each of the conveyor sections comprises an elongated, longitudinally extending support frame, each conveying means comprising a plurality of longitudinally spaced pairs of wheels whose axes are parallel and inclined to the longitudinal direction of pipe feed, the wheels of each pair being longitudinally offset whereby to form a cradle for supporting the pipe, respective mounting means for the pairs of wheels, and drive means coupled to one wheel of each pair for rotating the wheels in synchronism.

4. Apparatus according to claim 3, wherein the support frames of the first and second terminal conveyor sections are constrained by rails to move along a longitudinal path.

5. Apparatus according to claim 4, wherein each of said first and second power means comprises a linear displacement apparatus connected between the support frame of the respective terminal conveyor section and the support frame of the main conveyor section.

6. Apparatus according to claim 5, wherein each of said linear displacement apparatus is a hydraulic ram.

7. Apparatus according to claim 3, wherein each of the first terminal and main conveyor sections includes means providing a hinge connection between the respective support frame and the mounting means for the leading pair of wheels, and power means connected between the mounting means and the support frame for raising and lowering said leading pair of wheels to and from a position in which the wheels engage a pipe section to be advanced.

\* \* \* \* \*